(12) United States Patent
Tang et al.

(10) Patent No.: US 9,658,431 B1
(45) Date of Patent: May 23, 2017

(54) OPTICAL IMAGING LENS AND MOBILE DEVICE

(71) Applicant: Genius Electronic Optical Co., Ltd., Taichung (TW)

(72) Inventors: Tzu-Chien Tang, Taichung (TW); Yu-Ming Chen, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 15/159,818

(22) Filed: May 20, 2016

(30) Foreign Application Priority Data

Apr. 27, 2016 (CN) .......................... 2016 1 0268880

(51) Int. Cl.
| | |
|---|---|
| G02B 13/18 | (2006.01) |
| G02B 9/08 | (2006.01) |
| G02B 9/12 | (2006.01) |
| G02B 13/00 | (2006.01) |
| H04N 5/225 | (2006.01) |
| G02B 7/02 | (2006.01) |
| G02B 5/00 | (2006.01) |

(52) U.S. Cl.
CPC .......... *G02B 13/0035* (2013.01); *G02B 7/021* (2013.01); *G02B 9/12* (2013.01); *H04N 5/2254* (2013.01); *G02B 5/005* (2013.01); *G02B 13/001* (2013.01); *G02B 13/18* (2013.01)

(58) Field of Classification Search
CPC ...... G02B 13/0035; G02B 9/12; G02B 13/18; G02B 5/005; G02B 13/001
USPC ................................ 359/716, 739, 784, 791
See application file for complete search history.

(56) References Cited

U.S. PATENT DOCUMENTS

| | | | | |
|---|---|---|---|---|
| 2009/0185289 | A1* | 7/2009 | Do | ........................... G02B 9/12 359/716 |
| 2013/0222927 | A1* | 8/2013 | Kubota | .............. G02B 13/0035 359/716 |
| 2015/0029602 | A1* | 1/2015 | Kubota | .............. G02B 13/0035 359/791 |
| 2016/0116713 | A1* | 4/2016 | Hsu | ..................... G02B 13/0035 359/716 |

* cited by examiner

*Primary Examiner* — Evelyn A Lester
(74) *Attorney, Agent, or Firm* — Jianq Chyun IP Office

(57) ABSTRACT

An optical imaging lens includes an aperture stop and first, second, and third lens elements from an object side to an image side in order along an optical axis. Each of the lens elements has an object-side surface and an image-side surface. The image-side surface of the first lens element has a convex portion in a vicinity of a periphery. The second lens element has negative refracting power, and the image-side surface of the second lens element has a convex portion in a vicinity of the optical axis. The optical imaging lens satisfies: 2×ν1≤ν2+ν3, wherein ν1, ν2, and ν3 are respectively the coefficients of dispersion of the first, second, and third lens elements. A mobile device is also provided.

20 Claims, 17 Drawing Sheets

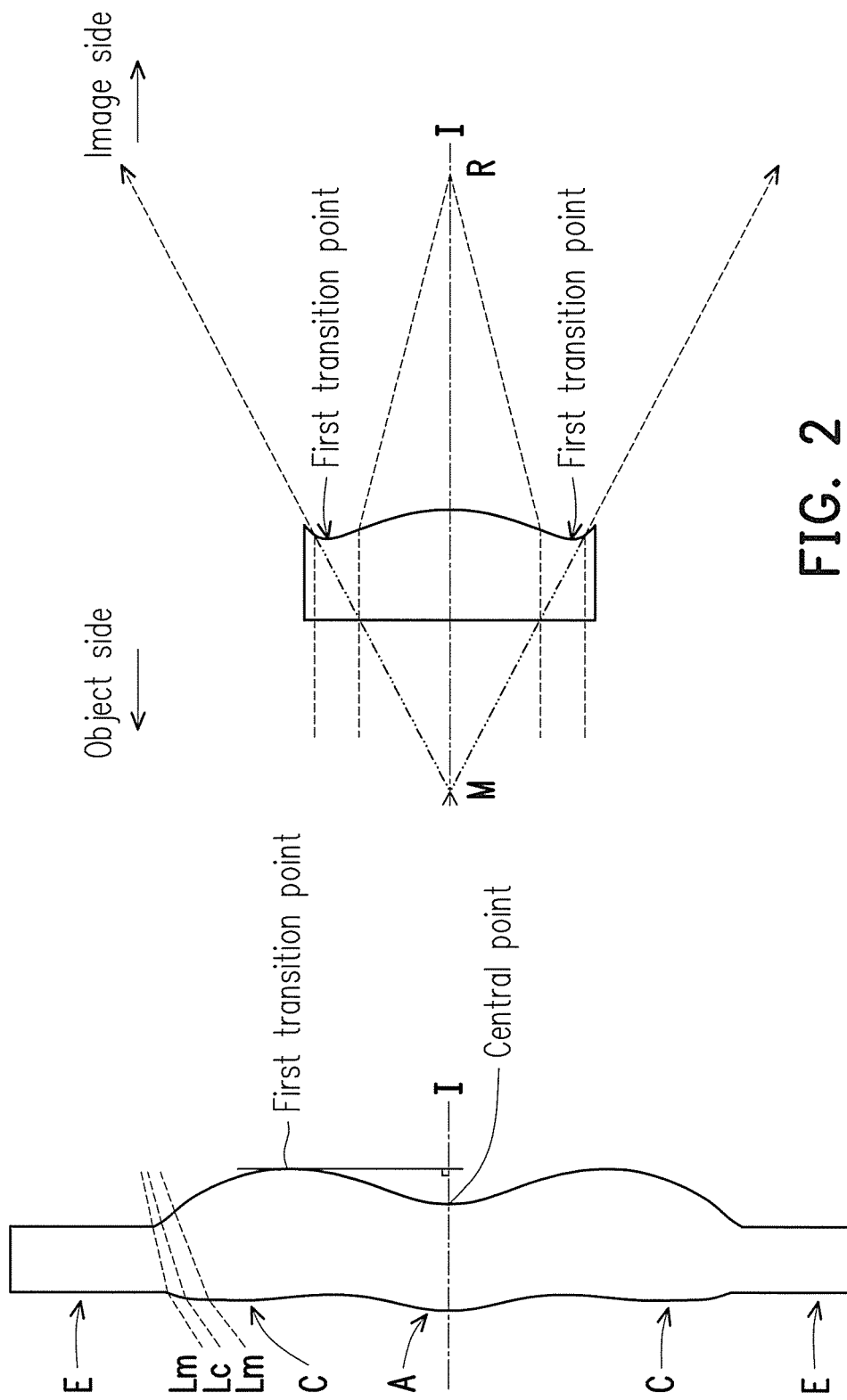

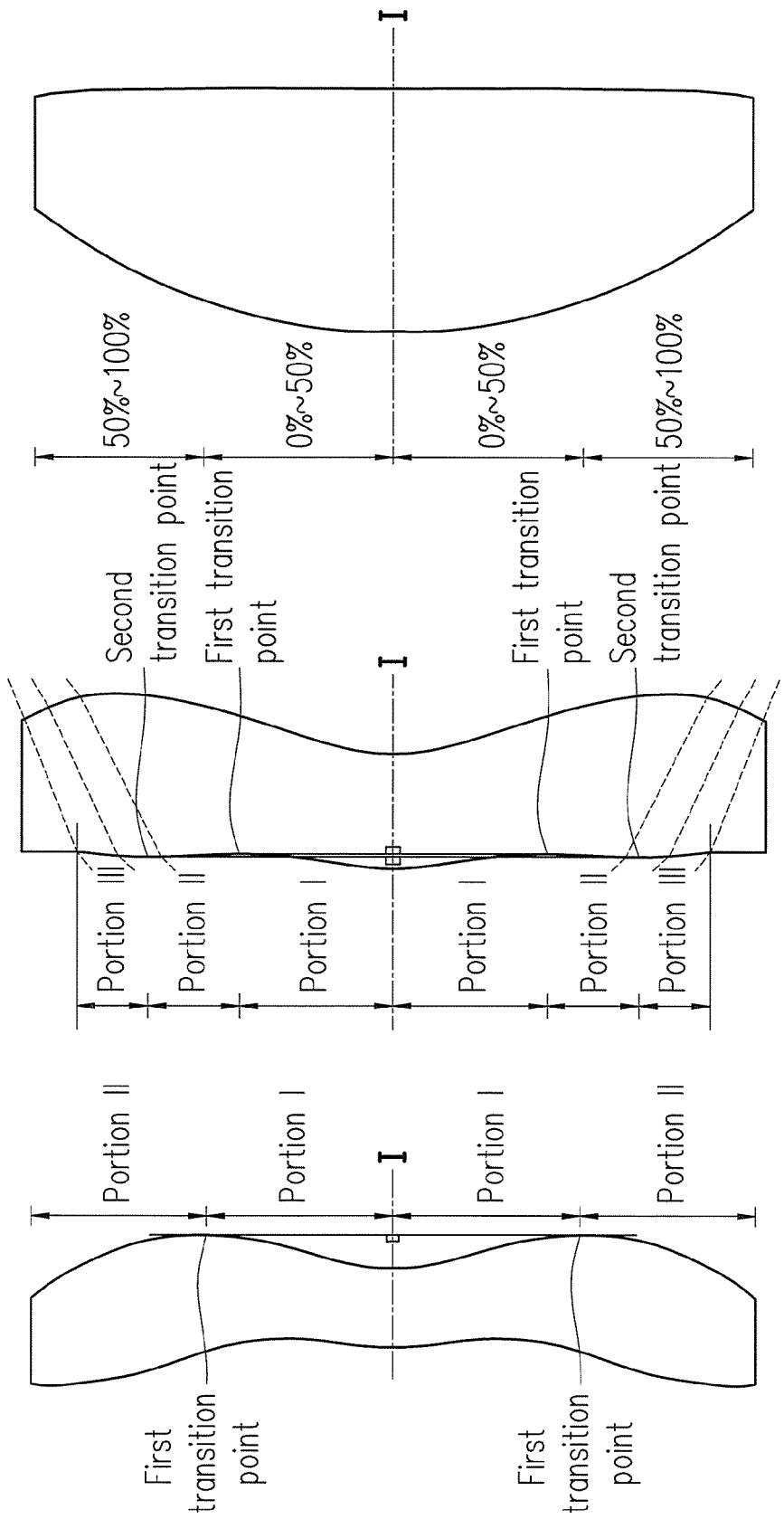

| First embodiment |||||||
|---|---|---|---|---|---|---|
| Effective focal length=2.857 mm, Half angle of view=28.250°, f-number=2.2, System length=3.436 mm, Image height=1.542 mm |||||||
| Lens element | Surface | Radius of curvature (mm) | Thickness (mm) | Index of refraction | Coefficient of dispersion | Focal length (mm) |
| Object | | Infinite | 300 | | | |
| Aperture stop 2 | | Infinite | 0.100 | | | |
| First lens element 3 | Object-side surface 31 | 1.279 | 0.706 | 1.571 | 29.921 | 2.715 |
| | Image-side surface 32 | 5.824 | 0.366 | | | |
| Second lens element 4 | Object-side surface 41 | -5.691 | 0.602 | 1.571 | 29.921 | -36.416 |
| | Image-side surface 42 | -8.137 | 0.262 | | | |
| Third lens element 5 | Object-side surface 51 | 2.119 | 0.620 | 1.571 | 29.921 | -10.113 |
| | Image-side surface 52 | 1.385 | 0.3 | | | |
| Filter 9 | Object-side surface 91 | Infinite | 0.210 | 1.510 | 64.166 | |
| | Image-side surface 92 | Infinite | 0.370 | | | |
| | Image plane 100 | Infinite | | | | |

FIG. 8

| Surface | K | $a_4$ | $a_6$ | $a_8$ | $a_{10}$ |
|---|---|---|---|---|---|
| 31 | 0.000000E+00 | -1.398289E-02 | -3.389643E-02 | 3.933407E-02 | -6.235313E-02 |
| 32 | 0.000000E+00 | -2.378428E-02 | -9.464249E-02 | 1.607515E-01 | -3.122047E-01 |
| 41 | 0.000000E+00 | -8.349856E-02 | -1.230253E-02 | 3.327514E-01 | -3.777905E-01 |
| 42 | 0.000000E+00 | -3.397125E-01 | 7.741328E-01 | -7.245927E-01 | 5.548153E-01 |
| 51 | 0.000000E+00 | -3.918638E-01 | 4.884189E-02 | 2.537206E-03 | 1.418264E-03 |
| 52 | 0.000000E+00 | -9.320496E-01 | 1.119870E-02 | -2.452946E-02 | -1.712267E-03 |
| Surface | $a_{12}$ | $a_{14}$ | $a_{16}$ | | |
| 31 | 0.000000E+00 | 0.000000E+00 | 0.000000E+00 | | |
| 32 | 1.230444E-01 | 0.000000E+00 | 0.000000E+00 | | |
| 41 | -5.419089E-02 | 0.000000E+00 | 0.000000E+00 | | |
| 42 | 3.065892E-01 | -1.029053E-01 | 0.000000E+00 | | |
| 51 | -9.279148E-05 | -7.627173E-05 | 0.000000E+00 | | |
| 52 | -1.345726E-03 | -7.842507E-04 | 4.337148E-05 | | |

FIG. 9

| Second embodiment ||||||
|---|---|---|---|---|---|
| Effective focal length=2.902 mm , Half angle of view=27.887°, f-number=2.2, System length=3.408 mm, Image height=1.542 mm ||||||
| Lens element | Surface | Radius of curvature (mm) | Thickness (mm) | Index of refraction | Coefficient of dispersion | Focal length (mm) |
| Object | | Infinite | 300 | | | |
| Aperture stop 2 | | Infinite | 0.1 | | | |
| First lens element 3 | Object-side surface 31 | 1.299 | 0.683 | 1.571 | 29.921 | 2.722 |
| | Image-side surface 32 | 6.407 | 0.476 | | | |
| Second lens element 4 | Object-side surface 41 | -4.644 | 0.461 | 1.571 | 29.921 | -12.202 |
| | Image-side surface 42 | -14.428 | 0.283 | | | |
| Third lens element 5 | Object-side surface 51 | 1.765 | 0.614 | 1.571 | 29.921 | -27.450 |
| | Image-side surface 52 | 1.386 | 0.3 | | | |
| Filter 9 | Object-side surface 91 | Infinite | 0.21 | 1.510 | 64.166 | |
| | Image-side surface 92 | Infinite | 0.381 | | | |
| | Image plane 100 | Infinite | | | | |

FIG. 12

| Surface | K | $a_4$ | $a_6$ | $a_8$ | $a_{10}$ |
|---|---|---|---|---|---|
| 31 | 0.000000E+00 | -1.776988E-02 | -3.206957E-02 | 3.943081E-02 | -7.348050E-02 |
| 32 | 0.000000E+00 | -2.151996E-02 | -9.137525E-02 | 1.612253E-01 | -3.089802E-01 |
| 41 | 0.000000E+00 | -9.061782E-02 | 3.751433E-02 | 3.341084E-01 | -3.862483E-01 |
| 42 | 0.000000E+00 | -3.609988E-01 | 8.235233E-01 | -6.981868E-01 | 5.588341E-01 |
| 51 | 0.000000E+00 | -3.771276E-01 | 3.757767E-02 | 7.782084E-04 | 9.646130E-04 |
| 52 | 0.000000E+00 | -9.129237E-01 | 5.855533E-03 | -2.269981E-02 | -8.203831E-04 |
| Surface | $a_{12}$ | $a_{14}$ | $a_{16}$ | | |
| 31 | 0.000000E+00 | 0.000000E+00 | 0.000000E+00 | | |
| 32 | 1.241050E-01 | 0.000000E+00 | 0.000000E+00 | | |
| 41 | -5.869691E-02 | 0.000000E+00 | 0.000000E+00 | | |
| 42 | 2.630227E-01 | -2.127592E-01 | 0.000000E+00 | | |
| 51 | -8.336281E-06 | -8.876634E-05 | 0.000000E+00 | | |
| 52 | -1.439671E-03 | -3.017496E-04 | -1.551545E-04 | | |

FIG. 13

| Third embodiment |||||||
|---|---|---|---|---|---|---|
| Effective focal length=2.983 mm , Half angle of view=26.706°, f-number=2.5, System length=3.699 mm, Image height=1.542 mm |||||||
| Lens element | Surface | Radius of curvature (mm) | Thickness (mm) | Index of refraction | Coefficient of dispersion | Focal length (mm) |
| Object | | Infinite | 300 | | | |
| Aperture stop 2 | | Infinite | 0.129 | | | |
| First lens element 3 | Object-side surface 31 | 1.317 | 0.583 | 1.571 | 29.921 | 2.926 |
| | Image-side surface 32 | 5.210 | 0.290 | | | |
| Second lens element 4 | Object-side surface 41 | -1.751 | 0.580 | 1.571 | 29.921 | -9.931 |
| | Image-side surface 42 | -2.837 | 0.235 | | | |
| Third lens element 5 | Object-side surface 51 | 1.235 | 0.524 | 1.571 | 29.921 | 11.165 |
| | Image-side surface 52 | 1.295 | 0.3 | | | |
| Filter 9 | Object-side surface 91 | Infinite | 0.21 | 1.510 | 64.166 | |
| | Image-side surface 92 | Infinite | 0.976 | | | |
| | Image plane 100 | Infinite | | | | |

FIG. 16

| Surface | K | $a_4$ | $a_6$ | $a_8$ | $a_{10}$ |
|---|---|---|---|---|---|
| 31 | 0.000000E+00 | -9.729225E-03 | -2.659881E-02 | 1.440545E-02 | -5.748088E-02 |
| 32 | 0.000000E+00 | -2.981960E-02 | -1.222812E-01 | 1.611470E-01 | -2.910915E-01 |
| 41 | 0.000000E+00 | -6.436796E-03 | 1.156531E-01 | 2.964670E-01 | -4.483156E-01 |
| 42 | 0.000000E+00 | -3.270871E-01 | 8.568350E-01 | -7.009056E-01 | 4.599051E-01 |
| 51 | 0.000000E+00 | -3.643934E-01 | 2.253728E-02 | -4.220308E-03 | 6.511542E-04 |
| 52 | 0.000000E+00 | -8.222820E-01 | 4.869632E-03 | -3.607776E-03 | 8.745546E-03 |
| Surface | $a_{12}$ | $a_{14}$ | $a_{16}$ | | |
| 31 | 0.000000E+00 | 0.000000E+00 | 0.000000E+00 | | |
| 32 | 8.533483E-02 | 0.000000E+00 | 0.000000E+00 | | |
| 41 | 4.625429E-02 | 0.000000E+00 | 0.000000E+00 | | |
| 42 | 1.715092E-01 | -1.868344E-01 | 0.000000E+00 | | |
| 51 | -1.109111E-04 | 9.392771E-05 | 0.000000E+00 | | |
| 52 | 5.801022E-03 | 2.116492E-03 | 6.201023E-04 | | |

FIG. 17

| Fourth embodiment | | | | | | |
|---|---|---|---|---|---|---|
| Effective focal length=2.889 mm , Half angle of view=27.759°, f-number=2.6, System length=3.551 mm, Image height=1.574 mm | | | | | | |
| Lens element | Surface | Radius of curvature (mm) | Thickness (mm) | Index of refraction | Coefficient of dispersion | Focal length (mm) |
| Object | | Infinite | 300 | | | |
| Aperture stop 2 | | Infinite | -0.046 | | | |
| First lens element 3 | Object-side surface 31 | 1.227 | 0.799 | 1.571 | 29.921 | 2.483 |
| | Image-side surface 32 | 6.969 | 0.205 | | | |
| Second lens element 4 | Object-side surface 41 | -2.895 | 0.725 | 1.571 | 29.921 | -1062.022 |
| | Image-side surface 42 | -3.173 | 0.298 | | | |
| Third lens element 5 | Object-side surface 51 | 3.072 | 0.669 | 1.571 | 29.921 | -5.098 |
| | Image-side surface 52 | 1.376 | 0.3 | | | |
| Filter 9 | Object-side surface 91 | Infinite | 0.21 | 1.510 | 64.166 | |
| | Image-side surface 92 | Infinite | 0.345 | | | |
| | Image plane 100 | Infinite | | | | |

FIG. 20

| Surface | K | $a_4$ | $a_6$ | $a_8$ | $a_{10}$ |
|---|---|---|---|---|---|
| 31 | 0.000000E+00 | -1.173141E-02 | -1.447808E-02 | 5.059124E-02 | -1.048715E-01 |
| 32 | 0.000000E+00 | -8.903361E-02 | -1.447386E-01 | 3.186798E-02 | -4.548320E-01 |
| 41 | 0.000000E+00 | -2.238763E-01 | -9.947077E-02 | 3.223384E-01 | -4.246812E-01 |
| 42 | 0.000000E+00 | -3.867866E-01 | 7.935480E-01 | -7.408500E-01 | 5.594658E-01 |
| 51 | 0.000000E+00 | -4.033759E-01 | 6.777370E-02 | 6.381766E-04 | 2.237897E-03 |
| 52 | 0.000000E+00 | -9.166031E-01 | 4.236724E-02 | -2.679320E-02 | 8.236644E-04 |
| Surface | $a_{12}$ | $a_{14}$ | $a_{16}$ | | |
| 31 | 0.000000E+00 | 0.000000E+00 | 0.000000E+00 | | |
| 32 | 2.174046E-02 | 0.000000E+00 | 0.000000E+00 | | |
| 41 | -4.834364E-01 | 0.000000E+00 | 0.000000E+00 | | |
| 42 | 3.618108E-01 | -5.797712E-02 | 0.000000E+00 | | |
| 51 | -3.316095E-04 | 3.329171E-04 | 0.000000E+00 | | |
| 52 | -2.391784E-03 | -8.351581E-05 | -1.530968E-04 | | |

FIG. 21

| Condition formula | First embodiment | Second embodiment | Third embodiment | Fourth embodiment |
|---|---|---|---|---|
| EFL | 2.857 | 2.902 | 2.983 | 2.889 |
| T1 | 0.706 | 0.683 | 0.583 | 0.799 |
| G1 | 0.366 | 0.476 | 0.290 | 0.205 |
| T2 | 0.602 | 0.461 | 0.580 | 0.725 |
| G2 | 0.262 | 0.283 | 0.235 | 0.298 |
| T3 | 0.620 | 0.614 | 0.524 | 0.669 |
| G3 | 0.300 | 0.300 | 0.300 | 0.300 |
| TF | 0.210 | 0.210 | 0.210 | 0.210 |
| GFP | 0.379 | 0.405 | 0.979 | 0.325 |
| BFL | 0.880 | 0.891 | 1.486 | 0.855 |
| TL | 2.556 | 2.517 | 2.213 | 2.695 |
| ALT | 1.928 | 1.758 | 1.687 | 2.192 |
| EFL/T2 | 4.748 | 6.300 | 5.140 | 3.986 |
| (G1+T1)/BFL | 1.219 | 1.300 | 0.588 | 1.173 |
| EFL/(T2+T1) | 2.184 | 2.539 | 2.565 | 1.896 |
| (T2+G1)/BFL | 1.100 | 1.051 | 0.586 | 1.087 |
| BFL/T1 | 1.246 | 1.306 | 2.550 | 1.071 |
| EFL/ALT | 1.482 | 1.651 | 1.768 | 1.318 |
| EFL/T1 | 4.044 | 4.252 | 5.119 | 3.617 |
| EFL/TL | 1.118 | 1.153 | 1.348 | 1.072 |
| (T2+G2)/T2 | 1.435 | 1.614 | 1.406 | 1.412 |
| (T2+G1)/G2 | 3.700 | 3.315 | 3.700 | 3.115 |
| (T1+G2)/T1 | 1.370 | 1.414 | 1.404 | 1.374 |
| (G1+T1)/G2 | 4.100 | 4.100 | 3.710 | 3.363 |
| (T2+G2)/T1 | 1.222 | 1.089 | 1.400 | 1.281 |
| ALT/G2 | 7.370 | 6.218 | 7.170 | 7.349 |
| EFL/(T2+T3) | 2.338 | 2.700 | 2.700 | 2.073 |
| (T2+T3)/G2 | 4.670 | 3.803 | 4.694 | 4.672 |
| (T1+T3)/T1 | 1.878 | 1.900 | 1.900 | 1.838 |
| (T1+G2)/G2 | 3.700 | 3.415 | 3.476 | 3.677 |

FIG. 22

OPTICAL IMAGING LENS AND MOBILE DEVICE

CROSS-REFERENCE TO RELATED APPLICATION

This application claims the priority benefit of Chinese application serial no. 201610268880.X, filed on Apr. 27, 2016. The entirety of the above-mentioned patent application is hereby incorporated by reference herein and made a part of this specification.

BACKGROUND OF THE INVENTION

Field of the Invention

The invention relates to an optical lens and an electronic device, and more particularly, to an optical imaging lens and a mobile device.

Description of Related Art

In recent years, the popularity of mobile products such as mobile phones and digital cameras allowed the rigorous development of imaging module-related techniques, and the imaging module mainly contains elements such as an optical imaging lens, a module holder unit, and a sensor, and the thin and light developing trend of mobile phones and digital cameras also resulted in a greater demand of the compactness of the imaging module. With the advancement of the techniques of charge-coupled device (CCD) and complementary metal oxide semiconductor (CMOS) and reduction in size, the length of the optical imaging lens installed in the imaging module also needs to be correspondingly reduced. However, to prevent reduction in photographic effects and quality, when the length of the optical imaging lens is reduced, good optical performance still needs to be achieved. The most important feature of the optical aging lens is expectedly imaging quality and size.

Specifications of mobile products (such as mobile phones, cameras, tablet computers, personal digital assistants, and automotive video devices) are ever changing, and the key component thereof, the optical lens set, is also being more dynamically developed, and the application not only covers photography and video recording, but also includes, for instance, environmental monitoring and driving records recording, and with the advancement of image sensing techniques, consumer demand for, for instance, imaging quality is also increased. Therefore, the design of the optical lens set not only requires good imaging quality and smaller lens space, when driving in an environment of insufficient lighting, increase in the field of view and aperture size is also an important topic.

However, the optical imaging lens design cannot produce an optical imaging lens having both imaging quality and small size simply by reducing the ratio of, for instance, a lens having good imaging quality, and the design process involves material properties, and actual issues on the production line such as assembly yield also needs to be considered.

The technical difficulty of manufacturing a small lens is significantly greater than that of a traditional lens, and therefore how to manufacture an optical imaging lens satisfying consumer electronic product requirements and continuing to increase the imaging quality thereof have always been highly desired goals of production, government, and academia in the field.

Moreover, in terms of a three-piece lens structure, in a conventional optical imaging lens, the distance from the object-side surface of the first lens element to the image plane on the optical axis is large, which is counterproductive to the thinning of mobile phones and digital cameras.

SUMMARY OF THE INVENTION

The invention provides an optical imaging lens capable of maintaining good optical performance under the condition of a reduced lens system length.

An embodiment of the invention provides an optical imaging lens including an aperture stop, a first lens element, a second lens element, and a third lens element from an object side to an image side in order along an optical axis, and the first lens element to the third lens element each include an object-side surface facing the object side and allowing imaging rays to pass through and an image-side surface facing the image side and allowing the imaging rays to pass through. The image-side surface of the first lens element has a convex portion in a vicinity of a periphery of the first lens element. The second lens element has negative refracting power, and the image-side surface of the second lens element has a convex portion in a vicinity of the optical axis. The quantity of the lens elements of the optical imaging lens having refracting power is only three, and the optical imaging lens satisfies: $2 \times v1 \leq v2 + v3$, wherein $v1$ is the coefficient of dispersion of the first lens, $v2$ is the coefficient of dispersion of the second lens, and $v3$ is the coefficient of dispersion of the third lens element.

An embodiment of the invention provides a mobile device including a casing and an imaging module. The imaging module is installed inside the casing and includes the aforementioned optical imaging lens, a lens barrel, a module holder unit, and an image sensor. The optical imaging lens is disposed on the lens barrel, the lens barrel is disposed on the module holder unit, and the image sensor is disposed at an image side of the optical imaging lens.

Based on the above, the optical imaging lens and the mobile device of the embodiments of the invention have the following beneficial effects: via the concave and convex shape design and arrangement of the object-side surface or the image-side surface of the lens element, under the condition of a reduced system length, the optical imaging lens still has the optical performance of being capable of overcoming aberrations and provides good imaging quality.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic describing the surface structure of a lens element.

FIG. 2 is a schematic describing the surface concave and convex structure and the ray focus of a lens element.

FIG. 3 is a schematic describing the surface structure of the lens element of example 1.

FIG. 4 is a schematic describing the surface structure of the lens element of example 2.

FIG. 5 is a schematic describing the surface structure of the lens element of example 3.

FIG. 8 shows detailed optical data of the optical imaging lens of the first embodiment of the invention.

FIG. 9 shows aspheric surface parameters of the optical imaging lens of the first embodiment of the invention.

FIG. 12 shows detailed optical data of the optical imaging lens of the second embodiment of the invention.

FIG. 13 shows aspheric surface parameters of the optical imaging lens of the second embodiment of the invention.

FIG. 16 shows detailed optical data of the optical imaging lens of the third embodiment of the invention.

FIG. 17 shows aspheric surface parameters of the optical imaging lens of the third embodiment of the invention.

FIG. 20 shows detailed optical data of the optical imaging lens of the fourth embodiment of the invention.

FIG. 21 shows aspheric surface parameters of the optical imaging lens of the fourth embodiment of the invention.

FIG. 22 shows the numeric values of various important parameters and relationship formulas thereof of the optical imaging lens elements of the first to fourth embodiments of the invention.

DESCRIPTION OF THE EMBODIMENTS

Figure 6:
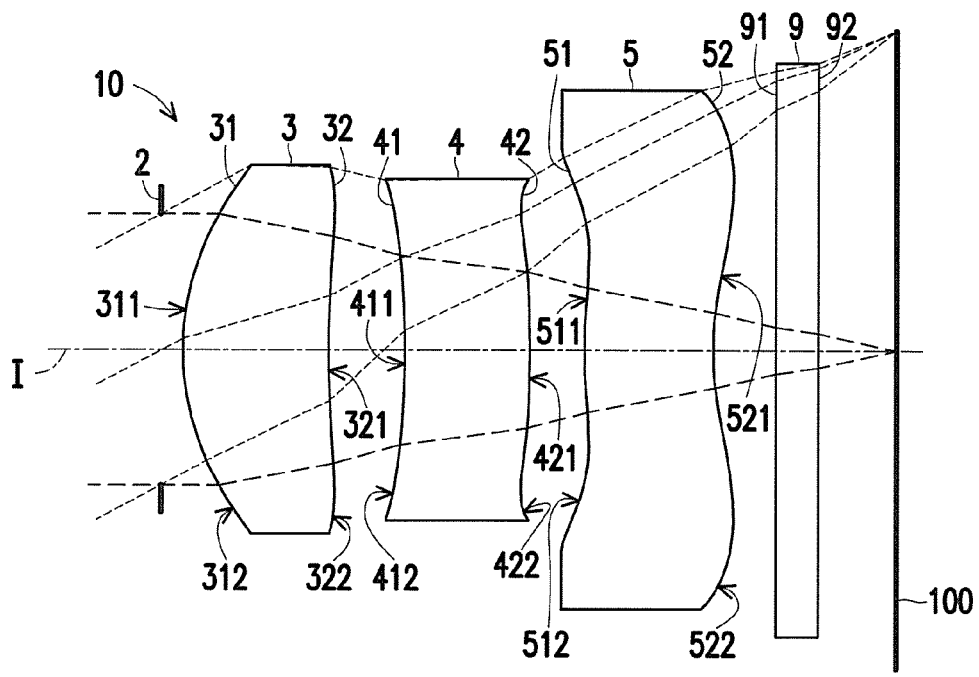
FIG. 6 is a schematic of the optical imaging lens of the first embodiment of the invention.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens element surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

FIG. 6 is a schematic of the optical imaging lens of the first embodiment of the invention, and FIG. 7A to FIG. 7D are diagrams of the longitudinal spherical aberration and various aberrations of the optical imaging lens of the first embodiment. Referring first to FIG. 6, the optical imaging lens 10 of the first embodiment of the invention includes an aperture stop 2, a first lens element 3, a second lens element 4, a third lens element 5, and a filter 9 from the object side to the image side in order along an optical axis I of optical the imaging lens 10. When rays emitted by an object to be photographed enter the optical imaging lens 10 and pass through the aperture stop 2, the first lens element 3, the second lens element 4, the third lens element 5, and the filter 9, an image is formed on an image plane 100. The filter 9 is, for instance, an infrared (IR) cut filter used to prevent transmission of IR in a portion of the IR waveband in the rays to the image plane 100 and affecting imaging quality. It should be added that, the object side is a side facing the object to be photographed and the image side is a side facing the image plane 100.

The first lens element 3, the second lens element 4, the third lens element 5, and the filter 9 all each have an object-side surface 31, 41, 51, 91 facing the object side and allowing the imaging rays to pass through and an image-side surface 32, 42, 52, 92 facing the image side and allowing the imaging rays to pass through.

Moreover, to meet the demand for a light product, the first lens element 3 to the third lens element 5 all have refracting power and are all made of a plastic material, but the material of the first lens element 3 to the third lens element 5 is not limited thereto.

The first lens element 3 has a positive refracting power. The object-side surface 31 of the first lens element 3 is a convex surface and has a convex portion 311 in a vicinity of the optical axis I and a convex portion 312 in a vicinity of a periphery of the first lens element 3. The image-side surface 32 of the first lens element 3 has a concave portion 321 in a vicinity of the optical axis I and a convex portion 322 in a vicinity of the periphery of the first lens element 3. In the present embodiment, the object-side surface 31 and the image-side surface 32 of the first lens element 3 are both aspheric surfaces.

The second lens element 4 has a negative refracting power. The object-side surface 41 of the second lens element 4 is a concave surface and has a concave portion 411 in a vicinity of the optical axis I and a concave portion 412 in a vicinity of a periphery of the second lens element 4. The image-side surface 42 of the second lens element 4 has a convex portion 421 in a vicinity of the optical axis I and a concave portion 422 in a vicinity of a periphery of the second lens element 4. In the present embodiment, the object-side surface 41 and the image-side surface 42 of the second lens element 4 are both aspheric surfaces.

The third lens element 5 has a negative refracting power. The object-side surface 51 of the third lens element 5 has a convex portion 511 in a vicinity of the optical axis I and a concave portion 512 in a vicinity of a periphery of the third lens element 5. The image-side surface 52 of the third lens element 5 has a concave portion 521 in a vicinity of the optical axis I and a convex portion 522 in a vicinity of the periphery of the third lens element 5. In the present embodiment, the object-side surface 51 and the image-side surface 52 of the third lens element 5 are both aspheric surfaces.

In the first embodiment, only the aforementioned lens elements have refracting power, and the quantity of the lens elements having refracting power is only three.

The other detailed optical data of the first embodiment is as shown in FIG. 8, and in the first embodiment, the effective focal length (EFL) of the whole optical imaging lens 10 is 2.857 mm, the half field of view (HFOV) thereof is 28.250°, the f-number (Fno) thereof is 2.2, the system length thereof is 3.436 mm, and the image height thereof is 1.542 mm. In particular, the system length refers to the distance from the object-side surface 31 of the first lens element 3 to the image plane 100 on the optical axis I.

Moreover, in the present embodiment, the six surfaces of the object-side surfaces 31, 41, and 51 and the image-side surfaces 32, 42, and 52 of the first lens element 3, the second lens element 4, and the third lens element 5 are all aspheric surfaces, and the aspheric surfaces are defined according to the following general formula:

$$Z(Y) = \frac{Y^2}{R} \bigg/ \left(1 + \sqrt{1 - (1+K)\frac{Y^2}{R^2}}\right) + \sum_{i=1}^{n} a_i \times Y^i \quad (1)$$

wherein:

Y: distance between a point on the aspheric surface curve and the optical axis I;

Z: depth (perpendicular distance between the point on the aspheric surface that is spaced by the distance Y from the optical axis I and a tangent plane tangent to the vertex of the aspheric surface on the optical axis I) of the aspheric surface;

R: radius of curvature of the lens element surface in a vicinity of the optical axis I;

K: conic constant;

$a_i$: i-th aspheric surface coefficient.

Each of the aspheric coefficients of the object-side surface 31 of the first lens element 3 to the image-side surface 52 of the third lens element 5 in general formula (1) is as shown in FIG. 9. In particular, column number 31 in FIG. 9 represents the aspheric coefficient of the object-side surface 31 of the first lens element 3, and the other column fields are defined in a similar manner.

Moreover, the relationship between each of the important parameters in the optical imaging lens 10 of the first embodiment is as shown in FIG. 22.

wherein,

T1 is the thickness of the first lens element 3 on the optical axis I;

T2 is the thickness of the second lens element 4 on the optical axis I;

T3 is the thickness of the third lens element 5 on the optical axis I;

TF is the thickness of the filter 9 on the optical axis I;

G1 is the distance from the image-side surface 32 of the first lens element 3 to the object-side surface 41 of the second lens element 4 on the optical axis I;

G2 is the distance from the image-side surface 42 of the second lens element 4 to the object-side surface 51 of the third lens element 5 on the optical axis I;

G3F is the distance from the image-side surface 52 of the third lens element 5 to the object-side surface 91 of the filter 9 on the optical axis I;

GFP is the distance from the image-side surface 92 of the filter 9 to the image plane 100 on the optical axis I;

Gaa is the sum of two air gaps from the first lens element 3 to the third lens element 5 on the optical axis I, i.e., the sum of G1 and G2;

ALT is the sum of the thicknesses of the first lens element 3, the second lens element 4, and the third lens element 5 on the optical axis I, i.e., the sum of T1, T2, and T3;

TTL is the distance from the object-side surface 31 of the first lens element 3 to the image plane 100 on the optical axis I;

TL is the distance from the object-side surface 31 of the first lens element 3 to the image-side surface 52 of the third lens element 5 on the optical axis I;

BFL is the distance from the image-side surface 52 of the third lens element 5 to the image plane 100 on the optical axis I;

EFL is the effective focal length of the optical imaging lens 10; and

TA is the distance from the aperture stop 2 to the object-side surface (such as the object-side surface 31 of the first lens element 3 in the present embodiment) of the next adjacent lens element on the optical axis I.

Moreover, the following are further defined:

GFP is the air gap between the filter 9 and the image plane 100 on the optical axis I;

f1 is the focal length of the first lens element 3;

f2 is the focal length of the second lens element 4;

f3 is the focal length of the third lens element 5;

n1 is the index of refraction of the first lens element 3;

n2 is the index of refraction of the second lens element 4;

n3 is the index of refraction of the third lens element 5;

84 1 is the Abbe number of the first lens element 3, and the Abbe number can also be referred to as the coefficient of dispersion;

ν2 is the Abbe number of the second lens element 4; and

ν3 is the Abbe number of the third lens element 5.

Figures 7A, 7B, 7C, 7D:
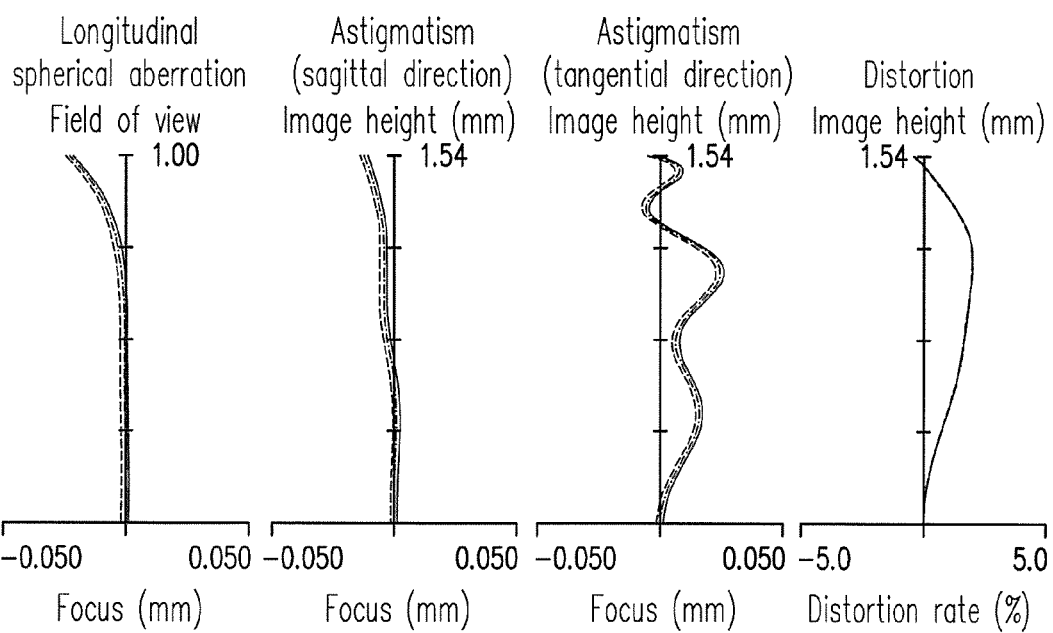
FIG. 7A to FIG. 7D are diagrams of the longitudinal spherical aberration and various aberrations of the optical imaging lens of the first embodiment.

Referring further to FIG. 7A to FIG. 7D, FIG. 7A describes longitudinal spherical aberration of the first embodiment, FIG. 7B and FIG. 7C respectively describe the astigmatic aberration in the sagittal direction and the astigmatism aberration in the tangential direction on the image plane 100 of the first embodiment, and FIG. 7D describes the distortion aberration on the image plane 100 of the first embodiment. In the longitudinal spherical aberration figure of FIG. 7A of the first embodiment, the curves formed by various wavelengths are all very close and are in a vicinity of the center, indicating the off-axis rays at different heights of each wavelength are all concentrated in a vicinity of the imaging point, and it can be seen from the deflection amplitude of the curve of each wavelength that, the imaging point deviation of the off-axis rays at different heights is controlled within the range of ±0.025 mm, and therefore in the present embodiment, the spherical aberration of the same wavelength is indeed significantly improved. Moreover, the distances between the three representative wavelengths are also relative close, indicating the imaging positions of different wavelength rays are relatively concentrated, and therefore the chromatic aberration is also significantly improved.

In the two astigmatic aberration figures of FIG. 7B and FIG. 7C, the focal length variation amount of three representative wavelengths in the entire field of view is within ±0.027 mm, indicating that the optical system of the first embodiment can effectively eliminate aberrations. The distortion aberration figure of FIG. 7D shows the distortion aberration of the first embodiment is maintained within the range of ±2.5%, indicating the distortion aberration of the first embodiment satisfies the imaging quality requirements of the optical system, and as a result, in comparison to the current optical lens, in the first embodiment, under the condition that the system length is reduced to about 3.436 mm, better imaging quality can still be provided. Therefore, in the first embodiment, under the condition of maintaining good optical performance, the lens length can be reduced and the shooting angle can be expanded to achieve a product design that is thinner and has increased field of view.

Figure 10:
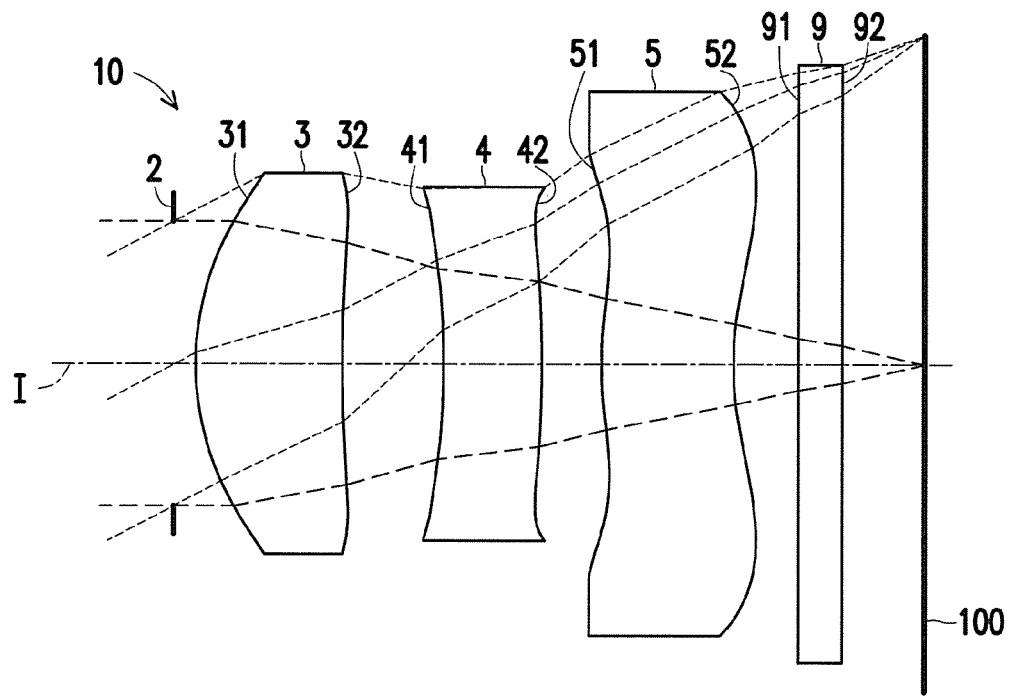
FIG. 10 is a schematic of the optical imaging lens of the second embodiment of the invention.

FIG. 10 is a schematic of the optical imaging lens of the second embodiment of the invention, and FIG. 11A to FIG. 11D are diagrams of the longitudinal spherical aberration and various aberrations of the optical imaging lens of the second embodiment. Referring first to FIG. 10, the second embodiment of the optical imaging lens 10 of the invention is similar to the first embodiment, and only the optical data, the aspheric coefficients, and the parameters of the lens elements 3, 4, and 5 are somewhat different. It should be mentioned here that, to clearly show the figure, in FIG. 10, a portion of the reference numerals of the same concave portion and convex portion as the first embodiment is omitted.

The detailed optical data of the optical imaging lens 10 is as shown in FIG. 12, and in the second embodiment, the effective focal length of the whole optical imaging lens 10 is 2.902 mm, the HFOV thereof is 27.887°, the Fno thereof is 2.2, the system length thereof is 3.408 mm, and the image height thereof is 1.542 mm.

FIG. 13 shows each of the aspheric coefficients of the object-side surface 31 of the first lens element 3 to the image-side surface 52 of the third lens element 5 of the second embodiment in general formula (1).

Moreover, the relationship between each of the important parameters in the optical imaging lens 10 of the second embodiment is as shown in FIG. 22.

Figures 11A, 11B, 11C, 11D:
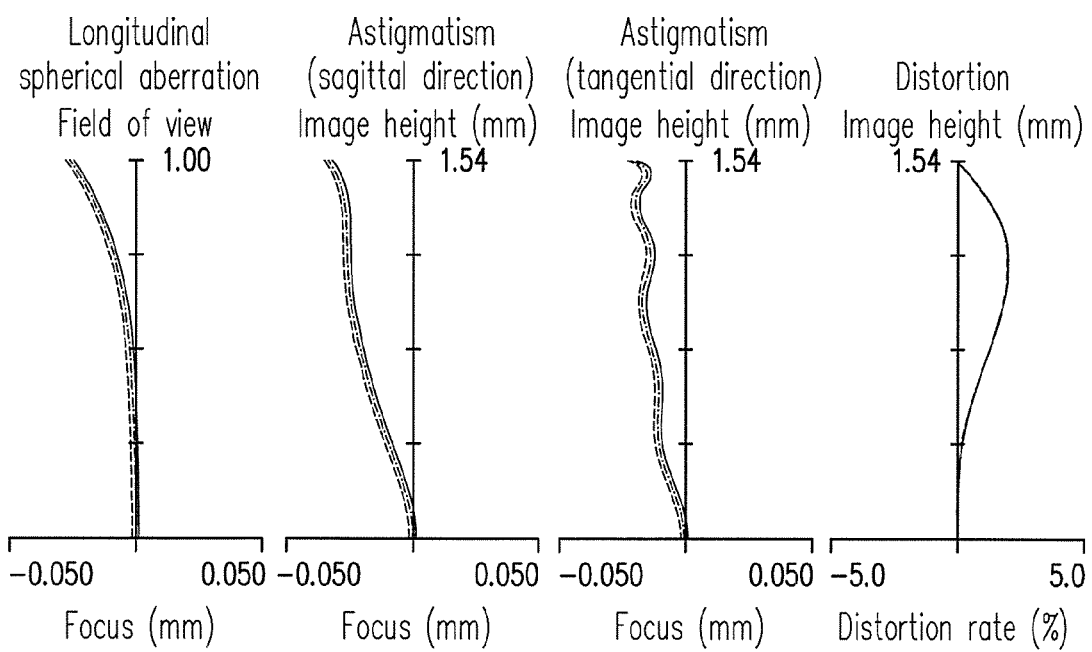
FIG. 11A to FIG. 11D are diagrams of the longitudinal spherical aberration and various aberrations of the optical imaging lens of the second embodiment.

In the longitudinal spherical aberration figure of FIG. 11A of the second embodiment, the imaging point deviation of off-axis rays at different heights is controlled to be within the range of ±0.027 mm. In the two astigmatic aberration figures of FIG. 11B and FIG. 11C, the focal length variation amount of three representative wavelengths in the entire field of view is within ±0.04 mm. The distortion aberration figure of FIG. 11D shows that the distortion aberration of the second embodiment is maintained within the range of ±2.5%. Accordingly, in comparison to the first embodiment, in the second embodiment, good imaging quality can still be provided under the condition of the system length reduced to about 3.408 mm.

It can be known from the above that, the advantages of the second embodiment in comparison to the first embodiment are: the system length of the second embodiment is less than the system length of the first embodiment, and the second embodiment is easier to manufacture than the first embodiment, and therefore the yield is higher.

Figure 14:
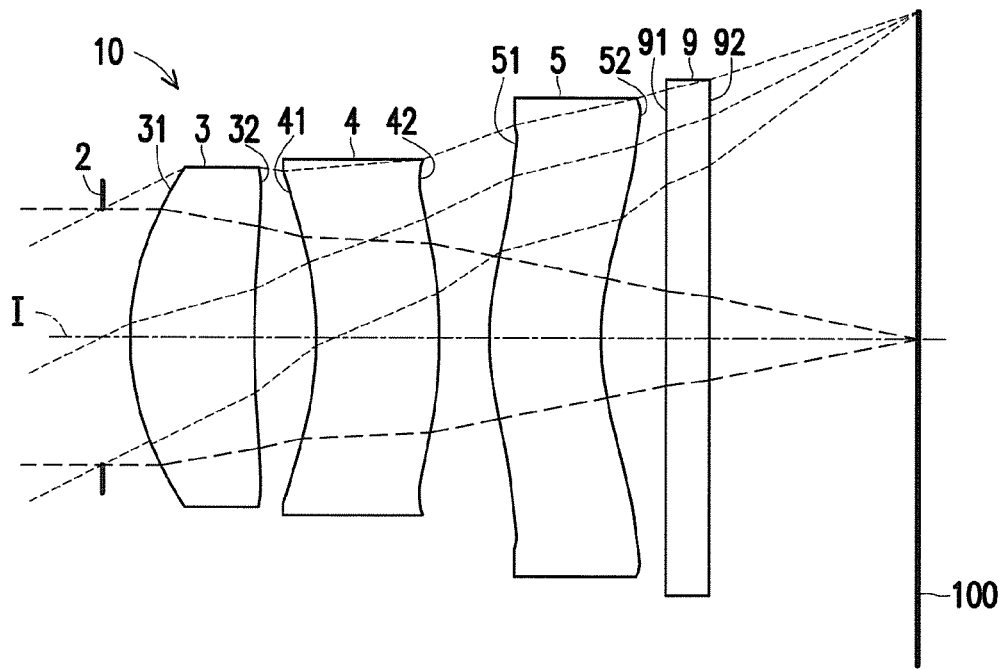
FIG. 14 is a schematic of the optical imaging lens of the third embodiment of the invention.

FIG. 14 is a schematic of the optical imaging lens of the third embodiment of the invention, and FIG. 15A to FIG. 15D are diagrams of the longitudinal spherical aberration and various aberrations of the optical imaging lens of the third embodiment. Referring first to FIG. 14, the third embodiment of the optical imaging lens 10 of the invention is similar to the first embodiment, and only the optical data, the aspheric coefficients, and the parameters of the lens elements 3, 4, and 5 are somewhat different, and the third lens element 5 has a positive refracting power. It should be mentioned here that, to clearly show the figure, in FIG. 14, reference numerals of the same concave portion and convex portion as the first embodiment are omitted.

The detailed optical data of the optical imaging lens 10 is as shown in FIG. 16, and in the third embodiment, the effective focal length of the whole optical imaging lens 10 is 2.983 mm, the HFOV thereof is 26.706°, the Fno thereof is 2.5, the system length thereof is 3.699 mm, and the image height thereof is 1.542 mm.

FIG. 17 shows each of the aspheric coefficients of the object-side surface 31 of the first lens element 3 to the image-side surface 52 of the third lens element 5 of the third embodiment in general formula (1).

Moreover, the relationship between each of the important parameters in the optical imaging lens 10 of the third embodiment is as shown in FIG. 22.

Figures 15A, 15B, 15C, 15D:
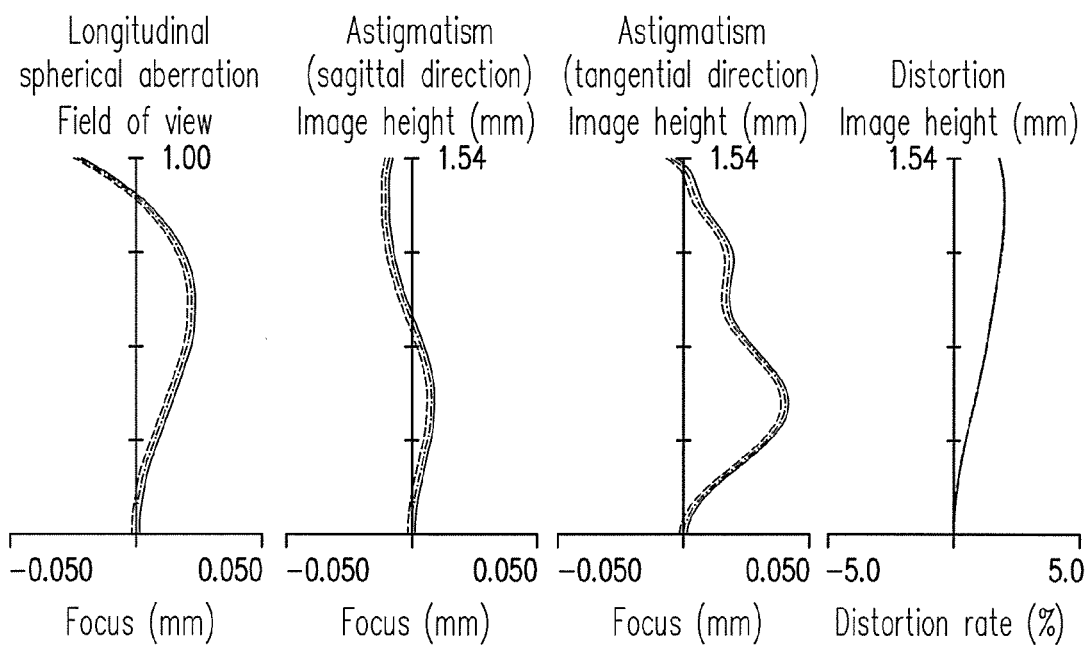
FIG. 15A to FIG. 15D are diagrams of the longitudinal spherical aberration and various aberrations of the optical imaging lens of the third embodiment.

In the longitudinal spherical aberration figure of FIG. 15A of the third embodiment, the imaging point deviation of off-axis rays at different heights is controlled to be within the range of ±0.025 mm. In the two astigmatic aberration figures of FIG. 15B and FIG. 15C, the focal length variation amount of three representative wavelengths in the entire field of view is within ±0.04 mm. The distortion aberration figure of FIG. 15D shows that the distortion aberration of the third embodiment is maintained within the range of ±2.5%. Accordingly, in comparison to the current optical lens, in the third embodiment, better imaging quality can still be provided under the condition of the system length reduced to about 3.699 mm.

It can be known from the above that, an advantage of the third embodiment in comparison to the first embodiment is: the third embodiment is easier to manufacture than the first embodiment, and therefore the yield is higher.

Figure 18:
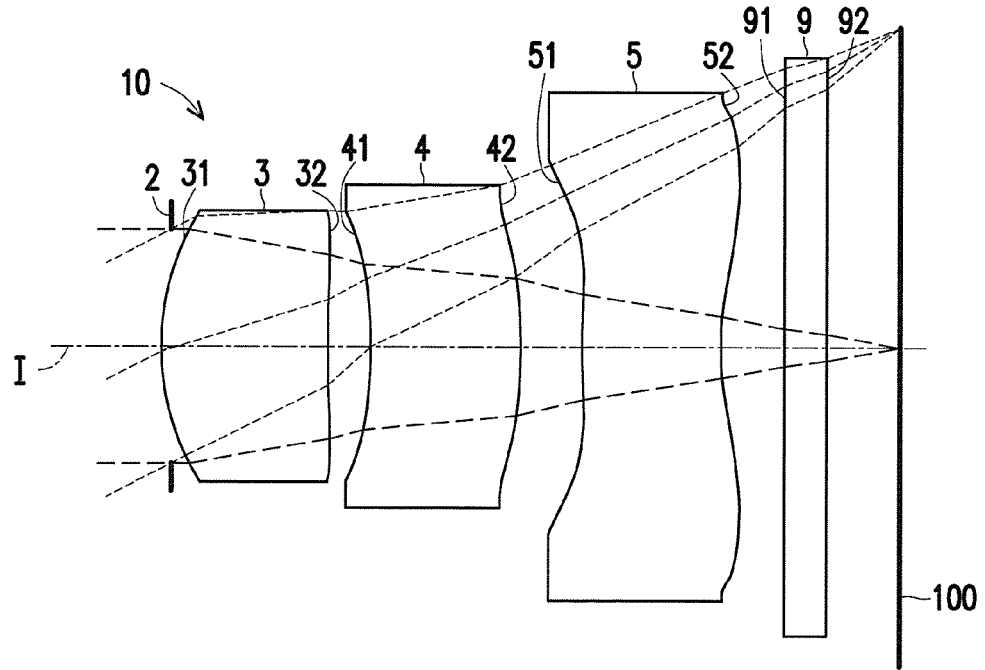
FIG. 18 is a schematic of the optical imaging lens of the fourth embodiment of the invention.

FIG. 18 is a schematic of the optical imaging lens of the fourth embodiment of the invention, and FIG. 19A to FIG. 19D are diagrams of the longitudinal spherical aberration and various aberrations of the optical imaging lens of the fourth embodiment. Referring first to FIG. 18, the fourth embodiment of the optical imaging lens 10 of the invention is similar to the first embodiment, and only the optical data, the aspheric coefficients, and the parameters of the lens elements 3, 4, and 5 are somewhat different. It should be mentioned here that, to clearly show the figure, in FIG. 18, reference numerals of the same concave portion and convex portion as the first embodiment are omitted.

The detailed optical data of the optical imaging lens 10 is as shown in FIG. 20, and in the fourth embodiment, the effective focal length of the whole optical imaging lens 10 is 2.889 mm, the HFOV thereof is 27.759°, the Fno thereof is 2.6, the system length thereof is 3.551 mm, and the image height thereof is 1.574 mm.

FIG. 21 shows each of the aspheric coefficients of the object-side surface 31 of the first lens element 3 to the image-side surface 52 of the third lens element 5 of the fourth embodiment in general formula (1).

Moreover, the relationship between each of the important parameters in the optical imaging lens 10 of the fourth embodiment is as shown in FIG. 22.

Figures 19A, 19B, 19C, 19D:
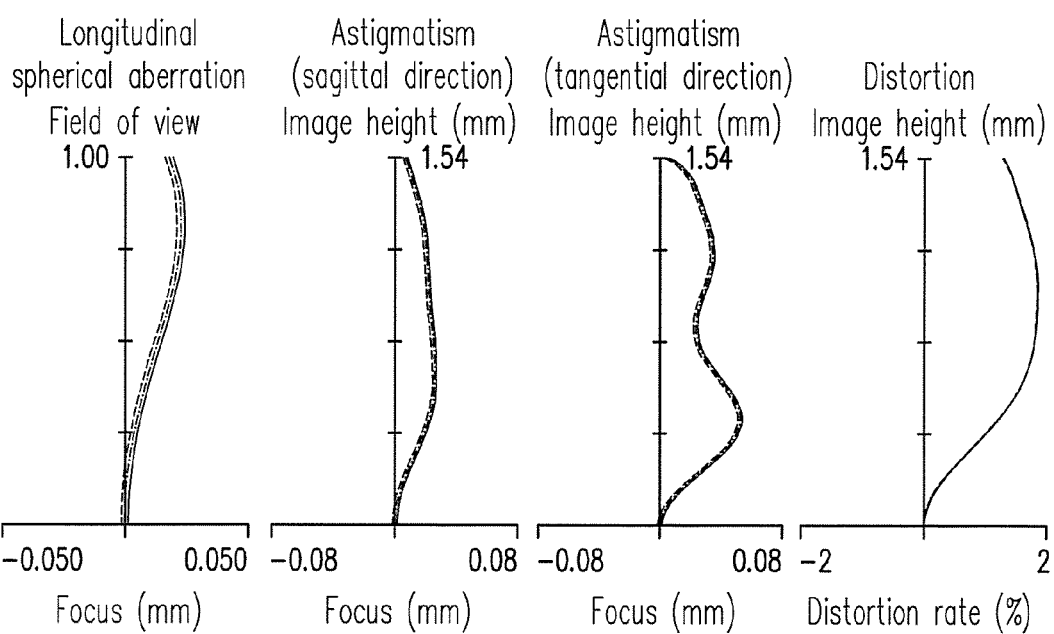
FIG. 19A to FIG. 19D are diagrams of the longitudinal spherical aberration and various aberrations of the optical imaging lens of the fourth embodiment.
Figure 23:
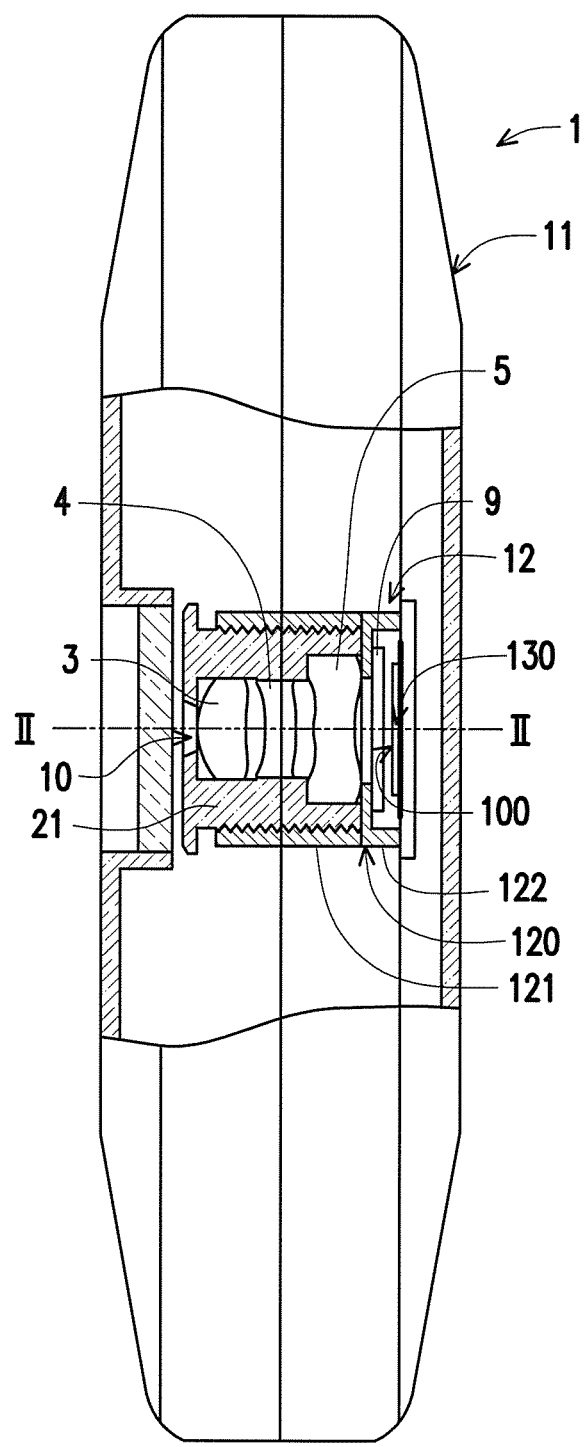
FIG. 23 is a cross-sectional schematic describing the first embodiment of the mobile device of the invention.
Figure 24:
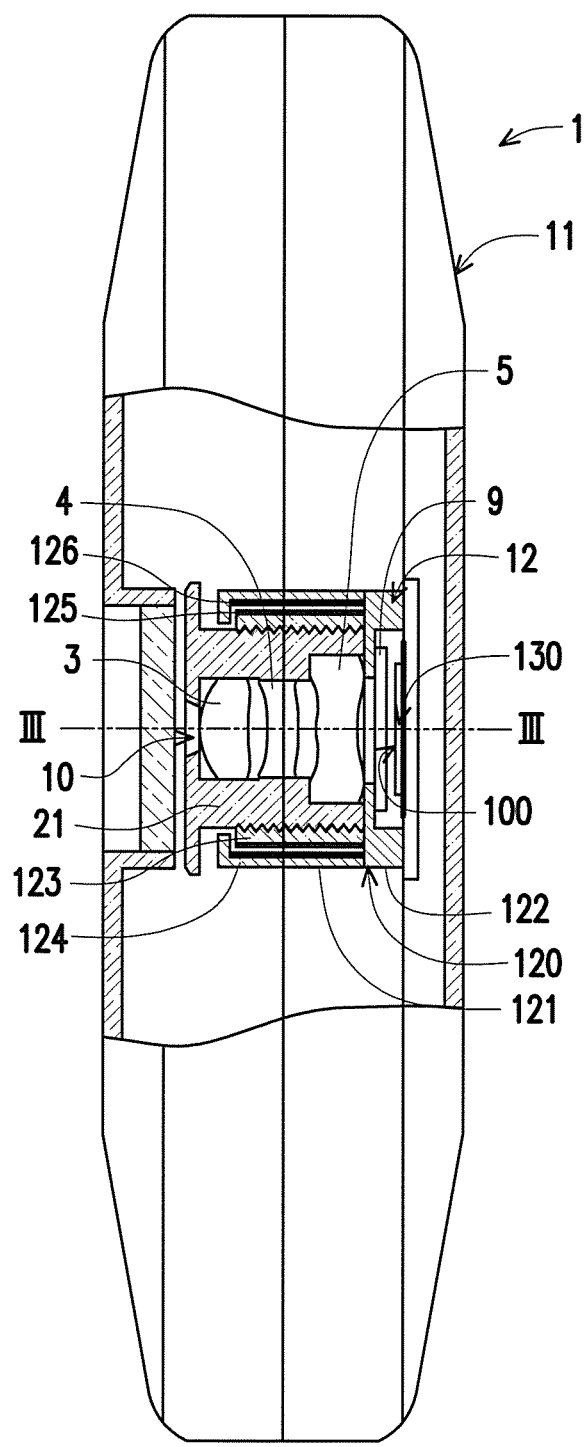
FIG. 24 is a cross-sectional schematic describing the second embodiment of the mobile device of the invention.

In the longitudinal spherical aberration figure of FIG. 19A of the fourth embodiment, the imaging point deviation of off-axis rays at different heights is controlled to be within the range of ±0.025 mm. In the two astigmatic aberration figures of FIG. 19B and FIG. 19C, the focal length variation amount of three representative wavelengths in the entire field of view is within ±0.06 mm. The distortion aberration figure of FIG. 19 shows that the distortion aberration of the fourth embodiment is maintained within the range of ±2%. Accordingly, in comparison to the current optical lens, in the fourth embodiment, better imaging quality can still be provided under the condition of the system length reduced to about 3.564 mm.

It can be known from the above that, the advantages of the fourth embodiment in comparison to the first embodiment are: the astigmatic aberration of the fourth embodiment is less than the astigmatic aberration of the first embodiment, the distortion aberration of the fourth embodiment is less than the distortion aberration of the first embodiment, and the fourth embodiment is easier to manufacture than the first embodiment, and therefore has higher yield.

FIG. 22 shows tables of each optical parameter of the four embodiments. When the relationship formula between each optical parameter in the optical imaging lens 10 of the embodiments of the invention satisfies at least one of the following condition formulas, the designer can design an optical imaging lens having good optical performance and reduced overall length and being technically applicable:

1. To achieve reduced lens system length, in the embodiments of the invention, the lens element thickness and the air gap between the lens elements are suitably reduced. However, under the premise of considering the difficulty of the lens assembly process and achieving imaging quality, the lens element thickness and the air gap between the lens elements need to be adjusted together, and therefore under the limitation of satisfying the numeric values of the following condition formulas, the optical imaging system can achieve better configuration:

(G1+T1)/BFL≤1.3, preferably 0.500≤(G1+T1)/BFL≤1.300;
(T2+G1)/BFL≤1.1, preferably 0.500≤(T2+G1)/BFL≤1.100;
BFL/T1≤2.6, preferably 0.700≤BFL/T1≤2.600;
(T2+G2)/T2≤1.7, preferably 1.100 (T2+G2)/T2≤1.700;
(T2+G1)/G2≤3.7, preferably 2.100≤(T2+G1)/G2≤3.700;
(T1+G2)/T1≤1.5, preferably 1.100≤(T1+G2)/T1≤1.500;
(G1+T1)/G2≤4.1, preferably 2.300≤(G1+T1)/G2≤4.100;
(T2+G2)/T1≤1.4, preferably 0.900≤(T2+G2)/T1≤1.400;
ALT/G2≤7.5, preferably 4.00023 ALT/G2≤7.500;
(T2+T3)/G2≤4.7, preferably 2.600≤(T2+T3)/G2≤4.700;
(T1+T3)/T1≤1.9, preferably 1.700≤(T1+T3)/T1≤1.900;
(T1+G2)/G2≤3.7, preferably 2.300≤(T1+G2)/G2≤3.700.

2. The reduction of the overall effective focal length of the imaging lens 10 facilitates the expansion of field of view, and therefore the overall effective focal length of the imaging lens 10 is designed to be smaller, and if the following condition formulas are satisfied, then during the thinning process of the optical system thickness, the field of view can also be expanded:

EFL/T2≤6.3, preferably 2.900≤EFL/T2≤6.300;
EFL/(T2+T1)≤2.8, preferably 1.200≤EFL/(T2+T1)≤2.800;
EFL/T1≤5.2, preferably 2.300≤EFL/T1≤5.200;
EFL/(T2+T3)≤2.7, preferably 1.300≤EFL/(T2+T3)≤2.700.

3. By satisfying the following conditions, the ratio of the effective focal length of the optical imaging lens to the system length of the optical imaging lens can be kept at suitable values, and difficulty in capturing a far object in the lens due to small parameters can be prevented, or excessive system length of the optical imaging lens due to large parameters can be prevented:

1.1≤EFL/ALT, preferably 1.100≤EFL/ALT≤2.000;
0.9≤EFL/TL, preferably 0.900≤EFL/TL≤1.400.

4. By satisfying the following condition formula, the clarity of object partial imaging can be effectively improved, and aberrations of object partial imaging can be effectively corrected:

2×v1≤v2+v3.

5. When the optical imaging lens of an embodiment of the invention satisfies any of the following conditions, the length of the numerator can be relatively reduced without changing the denominator, and the efficacy of reducing lens size is achieved: (G1+T1)/BFL≤1.3; (T2+G1)/BFL≤1.1; BFL/T1≤2.6; (T2+G2)/T2≤1.7; (T2+G1)/G2≤3.7; (T1+G2)/T1≤1.5; (G1+T1)/G2≤4.1; (T2+G2)/T1≤1.4; ALT/G2≤7.5; (T2+T3)/G2≤4.7; (T1+T3)/T1≤1.9; (T1+G2)/G2≤3.7; EFL/T2≤6.3; EFL/(T2+T1)≤2.8; EFL/T1≤5.2; EFL/(T2+T3)≤2.7. If any of the following conditions can be further satisfied, then better imaging quality can also be achieved: 0.500≤(G1+T1)/BFL≤1.300; 0.500≤(T2+G1)/BFL≤1.100; 0.700≤BFL/T1≤2.600; 1.100≤(T2+G2)/T2≤1.700; 2.100≤(T2+G1)/G2≤3.700; 1.100≤(T1+G2)/T1≤1.500; 2.300≤(G1+T1)/G2≤4.100; 0.900≤(T2+G2)/T1≤1.400; 4.000≤ALT/G2≤7.500; 2.600≤(T2+T3)/G2≤4.700; 1.700≤(T1+T3)/T1≤1.900; 2.300≤(T1+G2)/G2≤3.700.

6. When the optical imaging lens of the embodiments of the invention satisfies any of the following condition formulas, better configuration is achieved, and good imaging quality can be achieved under the premise of maintaining suitable yield: 1.1≤EFL/ALT; 0.9≤EFL/TL. If any of the following conditions can be further satisfied, then a more suitable size can be further maintained: 1.100≤EFL/ALT≤2.000; 0.900≤EFL/TL≤1.400.

However, based on the unpredictability of the optical system design, under the designs of the embodiments of the invention, by satisfying the above condition formulas, in the embodiments of the invention, lens length can be reduced, usable aperture is increased, field of view is increased, and imaging quality is increased, or assembly yield is increased such that the drawbacks of the prior art are reduced.

Based on the above, the optical imaging lens 10 of the embodiments of the invention can achieve the following efficacies and advantages:

1. The longitudinal spherical aberration, the astigmatic aberration, and the distortion of each embodiment of the invention all satisfy usage criteria. Moreover, the three representative wavelengths of 860 nm, 850 nm, and 840 nm are all concentrated in a vicinity of the imaging point at different heights of off-axis rays, and it can be seen from the deflection amplitude of each curve that the imaging point deviations at different heights of the off-axis rays can all achieve control and have good spherical aberration, aberration, and distortion control capability. Referring further to the imaging quality data, the distances between the three representative wavelengths of 860 nm, 850 nm, and 840 nm are also relatively close, indicating that the concentration of rays having different wavelengths under various states in the embodiments of the invention is good and excellent dispersion reduction capability is achieved, and therefore it can be known from the above that the embodiments of the invention have good optical performance. The optical imaging lens 10 of the embodiments of the invention can be used as night vision lens for IR imaging or pupil recognition lens, and it can be known from the above that the optical imaging lens 10 has good imaging effect to IR.

2. The negative refracting power of the third lens element 5 can be used to eliminate aberrations.

3. The concave portion 321 in the vicinity of the optical axis I and the convex portion 322 in the vicinity of the periphery of the image-side surface 32 of the first lens element 3 can facilitate the collection of imaging rays; the vicinity of the optical axis I of the image-side surface 42 of the second lens element 4 is the convex portion 421, the vicinity of the periphery of the image-side surface 42 is the concave portion 422, and the vicinity of the periphery of the object-side surface 51 of the third lens element 5 is the concave portion 512, and via the above characteristics, the effect of aberration correction can be achieved, wherein the vicinity of the periphery of the imaging-side surface 42 of the second lens element 4 is the concave portion 422, which can further effectively correct aberrations of object partial imaging.

4. Via the arrangement of the above designs, the lens length can be effectively reduced and imaging quality can be ensured at the same time, and the clarity of object partial imaging can be improved.

Referring to FIG. 35, it shows the first embodiment of a mobile device 1, i.e. a portable electronic device, applying the optical imaging lens 10, and the mobile device 1 includes a casing 11 and an imaging module 12 installed inside the casing 11. Here, the mobile device 1 is only exemplified as a mobile phone, but the form of the mobile device 1 is not limited thereto.

The imaging module 12 includes the optical imaging lens 10, a lens barrel 21 on which the optical imaging lens 10 is disposed, a module holder unit 120 on which the lens barrel 21 is disposed, and an image sensor 130 disposed at the image side of the optical imaging lens 10. The image plane 100 is formed on the image sensor 130.

The module holder unit 120 has a lens holder 121 and an image sensor holder 122 disposed between the lens holder 121 and the image sensor 130. In particular, the lens barrel 21 and the lens holder 121 are coaxially disposed along an axis II, and the lens barrel 21 is disposed on the inside of the lens holder 121.

Referring to FIG. 36, it is the second embodiment of a mobile device 1 applying the optical imaging lens 10, and the main difference between the mobile devices 1 of the second embodiment and the first embodiment is: the module holder unit 120 is in voice coil motor (VCM) form. The lens holder 121 has a first holder body 123 adhered to the outside of the lens barrel 21 and disposed along an axis III, a second holder body 124 disposed along the axis III and surrounding the outside of the first holder body 123, a coil 125 disposed between the outside of the first holder body 123 and the inside of the second holder body 124, and a magnetic element 126 disposed between the outside of the coil 125 and the inside of the second holder body 124.

The first holder body 123 of the lens holder 121 can be moved along the axis III with the lens barrel 21 and the optical imaging lens 10 disposed inside the lens barrel 21. The image sensor holder 122 and the second holder body 124 are adhered to each other. In particular, the filter 9 is disposed on the image sensor holder 122. The other elemental structures of the second embodiment of the mobile device 1 are similar to those of the mobile device 1 of the first embodiment and are not repeated herein.

By installing the optical imaging lens 10, since the system length of the optical imaging lens 10 can be effectively reduced, the thicknesses of the first embodiment and the second embodiment of the mobile device 1 can both be relatively reduced to manufacture a thinner product. Moreover, good optical performance and imaging quality can still be provided, and as a result, in addition to the economical benefit of reducing the usage amount of casing raw material, the mobile device 1 of the embodiments of the invention can also satisfy the product design trend and consumer demand of lightweight and small size.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. An optical imaging lens, comprising an aperture stop, a first lens element, a second lens element, and a third lens element from an object side to an image side in order along an optical axis, wherein the first lens element to the third lens element each comprise an object-side surface facing the object side and allowing imaging rays to pass through and an image-side surface facing the image side and allowing the imaging rays to pass through;

the image-side surface of the first lens element has a convex portion in a vicinity of a periphery of the first lens element; and the second lens element has negative refracting power, and the image-side surface of the second lens element has a convex portion in a vicinity of the optical axis;

wherein a quantity of lens elements of the optical imaging lens having refracting power is only three, and the optical imaging lens satisfies:

$2 \times v1 \leq v2 + v3$, wherein v1 is a coefficient of dispersion of the first lens element, v2 is a coefficient of dispersion of the second lens element, and v3 is a coefficient of dispersion of the third lens element.

2. The optical imaging lens of claim 1, wherein the optical imaging lens further satisfies: $EFL/T2 \leq 6.3$, wherein EFL is an effective focal length of the optical imaging lens and T2 is a thickness of the second lens element on the optical axis.

3. The optical imaging lens of claim 2, wherein the optical imaging lens further satisfies: $(G1+T1)/BFL \leq 1.3$, wherein G1 is an air gap from the first lens element to the second lens element on the optical axis, T1 is a thickness of the first lens element on the optical axis, and BFL is a distance from the image-side surface of the third lens element to an image plane of the optical imaging lens on the optical axis.

4. The optical imaging lens of claim 1, wherein the optical imaging lens further satisfies: $EFL/(T2+T1) \leq 2.8$, wherein EFL is an effective focal length of the optical imaging lens, T2 is a thickness of the second lens element on the optical axis, and T1 is a thickness of the first lens element on the optical axis.

5. The optical imaging lens of claim 4, wherein the optical imaging lens further satisfies: $(T2+G1)/BFL \leq 1.1$, wherein G1 is an air gap from the first lens element to the second lens element on the optical axis and BFL is a distance from the image-side surface of the third lens element to an image plane of the optical imaging lens on the optical axis.

6. The optical imaging lens of claim 1, wherein the optical imaging lens further satisfies: $BFL/T1 \leq 2.6$, wherein BFL is a distance from the image-side surface of the third lens element to an image plane of the optical imaging lens on the optical axis and T1 is a thickness of the first lens element on the optical axis.

7. The optical imaging lens of claim 6, wherein the optical imaging lens further satisfies: $1.1 \leq EFL/ALT$, wherein EFL is an effective focal length of the optical imaging lens and ALT is a sum of thicknesses of the first lens element, the second lens element, and the third lens element on the optical axis.

8. The optical imaging lens of claim 1, wherein the optical imaging lens further satisfies: $EFL/T1 \leq 5.2$, wherein EFL is an effective focal length of the optical imaging lens and T1 is a thickness of the first lens element on the optical axis.

9. The optical imaging lens of claim 8, wherein the optical imaging lens further satisfies: $0.9 \leq EFL/TL$, wherein TL is a distance from the object-side surface of the first lens element to the image-side surface of the third lens element on the optical axis.

10. The optical imaging lens of claim 1, wherein the optical imaging lens further satisfies: $(T2+G2)/T2 \leq 1.7$, wherein T2 is a thickness of the second lens element on the optical axis and G2 is an air gap from the second lens element to the third lens element on the optical axis.

11. The optical imaging lens of claim 10, wherein the optical imaging lens further satisfies: $(T2+G1)/G2 \leq 3.7$, wherein G1 is an air gap from the first lens element to the second lens element on the optical axis.

12. The optical imaging lens of claim 1, wherein the optical imaging lens further satisfies: $(T1+G2)/T1 \leq 1.5$, wherein T1 is a thickness of the first lens element on the optical axis and G2 is an air gap from the second lens element to the third lens element on the optical axis.

13. The optical imaging lens of claim 12, wherein the optical imaging lens further satisfies: $(G1+T1)/G2 \leq 4.1$, wherein G1 is an air gap from the first lens element to the second lens element on the optical axis.

14. The optical imaging lens of claim 1, wherein the optical imaging lens further satisfies: $(T2+G2)/T1 \leq 1.4$, wherein T2 is a thickness of the second lens element on the optical axis, G2 is an air gap from the second lens element to the third lens element on the optical axis, and T1 is a thickness of the first lens element on the optical axis.

15. The optical imaging lens of claim 14, wherein the optical imaging lens further satisfies: $ALT/G2 \leq 7.5$, wherein ALT is a sum of thicknesses of the first lens element, the second lens element, and the third lens element on the optical axis.

16. The optical imaging lens of claim 1, wherein the optical imaging lens further satisfies: $EFL/(T2+T3) \leq 2.7$, wherein EFL is an effective focal length of the optical imaging lens, T2 is a thickness of the second lens element on the optical axis, and T3 is a thickness of the third lens element on the optical axis.

17. The optical imaging lens of claim 16, wherein the optical imaging lens further satisfies: $(T2+T3)/G2 \leq 4.7$, wherein G2 is an air gap from the second lens element to the third lens element on the optical axis.

18. The optical imaging lens of claim 1, wherein the optical imaging lens further satisfies: $(T1+T3)/T1 \leq 1.9$, wherein T1 is a thickness of the first lens element on the optical axis and T3 is a thickness of the third lens element on the optical axis.

19. The optical imaging lens of claim 18, wherein the optical imaging lens further satisfies: $(T1+G2)/G2 \leq 3.7$, wherein G2 is an air gap from the second lens element to the third lens element on the optical axis.

20. A mobile device, comprising:
   a casing; and
   an imaging module installed inside the casing and comprising:
      the optical imaging lens of claim 1;
      a lens barrel on which the optical imaging lens is disposed;
      a module holder unit on which the lens barrel is disposed; and
      an image sensor disposed at an image side of the optical imaging lens.

* * * * *